(12) United States Patent
Eichenholz et al.

(10) Patent No.: US 6,301,275 B2
(45) Date of Patent: *Oct. 9, 2001

(54) SELF-FREQUENCY DOUBLED ND-DOPED YCOB LASER

(75) Inventors: Jason Eichenholz, Oviedo, FL (US); Qing Ye, Corning, NY (US); Dennis Allen Hammons, Orlando, FL (US); Bruce H. T. Chai, Oviedo, FL (US); Martin Richardson, Geneva, FL (US)

(73) Assignee: University of Central Florida, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/748,976

(22) Filed: Dec. 27, 2000

Related U.S. Application Data

(62) Division of application No. 09/495,770, filed on Feb. 1, 2000, now Pat. No. 6,185,236.
(60) Provisional application No. 60/118,301, filed on Feb. 2, 1999.

(51) Int. Cl.[7] .................................................... H01S 3/10
(52) U.S. Cl. ............................ 372/22; 372/41; 372/20; 372/69
(58) Field of Search ...................... 372/41, 20, 69, 372/22, 39, 10, 12, 13

(56) References Cited

U.S. PATENT DOCUMENTS

| | | | |
|---|---|---|---|
| 4,942,582 | 7/1990 | Kintz et al. ............................ | 372/18 |
| 5,058,118 | 10/1991 | Qui et al. ............................. | 372/21 |
| 5,123,026 | 6/1992 | Fan et al. ............................. | 372/22 |
| 5,381,428 | 1/1995 | McMahon et al. .................... | 372/22 |
| 5,610,934 | 3/1997 | Zarrabi ................................ | 372/70 |
| 5,677,921 | 10/1997 | Schaffers et al. ..................... | 372/22 |
| 5,751,751 | 5/1998 | Hargis et al. .......................... | 372/41 |
| 5,802,086 | 9/1998 | Hargis et al. .......................... | 372/22 |
| 6,185,231 | * 1/2001 | Hammons et al. .................... | 372/20 |
| 6,185,236 | * 1/2001 | Eichenholz et al. ................... | 372/41 |

FOREIGN PATENT DOCUMENTS

WO96/26464    8/1996   (WO).

OTHER PUBLICATIONS

Diode–pumped, Self–frequency Doubled Red Nd: YCOB Laser, Qing Ye, Lawrence Shah, Jason Eichelholz, Dennis Hammons, Robert Peale, Martin Richardson, Bruce Chai and Aland Chin, in TOPS Advanced Solid–State Lasers vol. 26, pp. 286, 1999.

980 nm Diode Pumped Laser Operation and Wavelength Tunability Performance in $Yb^{3+:}$ YCOB, D.A. Hammons, L. Shah, J. Eichenholz, Q. Ye, M. Richardson, B.H.T. Chai, and J. Cary, in TOPS Advanced Solid–State Lasers vol. 26, pp. 286, 1999.

Diode–pumped Laser Action and Self–Frequency Doubling in $Nd^{3+}$: YCOB, Jason Eichenholz, Dennis Hammons, Lawrence Shah, Q. Ye, Martin Richardson, Bruce Chai, Aland Chin and John Cary, Proc. SPIE, vol. 3613, pp. 30–37, Solid State Lasers VIII, May 1999.

(List continued on next page.)

*Primary Examiner*—Leon Scott, Jr.
(74) *Attorney, Agent, or Firm*—Law Offices of Brian S. Steinberger; Brian S. Steinberger

(57) ABSTRACT

Neodymium-doped yttrium calcium oxyborate (Nd:YCOB) is the single active gain element for a solid-state laser device capable of achieving both lasing and self-frequency doubling optical effects. A pumping source for optically pumping Nd:YCOB can generate a laser light output of approximately 400 mW at approximately 1060 nm wavelength and a self-frequency doubled output of approximately 60 mW at approximately 530 nm wavelength. Thus, a laser device can be designed that is compact, less expensive and a high-powered source of visible, green laser light.

11 Claims, 7 Drawing Sheets

OTHER PUBLICATIONS

Laser Action in $Yb^{3+}$:YCOB ($Yb^{3+}$:$Yca_4O(BO_3)_3$), Dennis Hammons, Jason Eichenholz, Lawrence Shah, Q. Ye, Robert Peale, Martin Richardson, Bruce and Chai and Aland Chin, Proc. SPIE, vol. 3613, pp. 226–223, Solid State Lasers VIII, May, 1999.

Investigation of Diode–Pumped, Self–frequency Doubled RGB Lasers from Nd:YCOB Crystals, Q. Ye, L. Shah, J. Eichenholz, D. Hammons, R. Peale, M. Richardson, A. Chin, B.H.T. Chai, *Optics Communications*, vol. 164, No. 1–3, pp. 33–37, 1999.

Diode–Pumped, Self–Frequency Doubling in a Nd: YCOB Laser, J. Eichenholz, D. Hammons, L. Shah, Q. Ye, M. Richardson, R. Peale, B.H.T. Chai, Applied Physics Letters, vol. 74, pp. 1954–1956, 1999.

Infrared Wavelength Tunability in Yb: YCOB, L. Shah, J. Eichenholz, Q. Ye, D. Hammons, B.H.T. Chai, M. Richardson, R. Peale, H. Qui, Conference Proceedings—Lasers and Electro–Optics Society Annual Meeting—LEOS, vol. 1, pp. 121–122, 1998.

Diode Pumped Laser Action and Self–Frequency Doubling $Nd^{3+}$: YCOB, D. Hammons, J. Eichenholz, L. Shah, Q. Ye, M. Richardson, B.H.T. Chai, Conference Proceedings—Lasers and Electro–Optics Society Annual Meeting—LEOS, vol. 1, pp. 123–124, 1998.

Laser Action in Yb3+: YCOB (Yb3+:$CA_4B_3O_{10}$), D. Hammons, J. Eichenholz, Q. Ye, B.H.T. Chai, L. Shah, R. Peale, M. Richardson and H. Qiu, *Optics Communication*, vol. 156, No. 4–6, pp. 327–330, 1998.

Second Harmonic Generation in Yb doped $YCa_4O(BO_3)_3$), Won K. Jang, Qing Ye, Jason Eichenholz, Martin Richardson, and Bruce Chai, *Optics Communication*, vol. 155, No. 4–6, pp. 332–334, 1998.

Visible Light Generation by Self–Frequency Doubling in Nd:YCOB, Bruce Chai, Jason Eichenholz, Qing Ye, Won K. Jang, Martin Richardson, presented at CLEO/IQEC '98, paper No. CthA6, San Francisco, California, May 1998.

Second Harmonic Generation in doped YCOB, Won K. Jang, Qing Ye, Jason Eichenholz, Bruce Chai, Martin Richardson, presented at CLEO/IQEC '98, paper No. CFG4, San Francisco, California, May 1998.

Self–Frequency Doubled Nd: YCOB Laser, B.H.T. Chai, J. Eichenholz, Q. Ye, D. Hammons, W.K. Jang, L. Shah, G.M. Luntz and M. Richardson, TOPS Advanced Solid–State Lasers, vol. 19, pp. 56, 1998.

Lasing, Second Harmonic conversion and Self–frequency Doubling of Yb: YCOB, B.H.T. Chai, D. Hammons, J. Eichenholz, Q. Ye W.K. Jang, L. Shah, G.M. Luntz, M. Richardson and H. Qui, TOPS Advanced Solid–State Lasers, vol. 19, pp. 59, 1998.

Crystal Growth of Yca40(B03)3 and Its Orientation Qing Ye and Bruce H.T. Chai, Journal of Crystal Growth, 1999, No. 197, p. 228–235.

* cited by examiner

SELF-FREQUENCY DOUBLED ND-DOPED YCOB LASER

This invention relates to solid-state laser devices, and in particular to a new type of compact, high-power laser with frequency doubling capabilities to generate coherent visible light, and claims priority to U.S. Provisional Patent Application Ser. No. 60/118,301, filed Feb. 2, 1999.

This invention is a Division of patent application Ser. No. 09/495,770 filed on Feb. 1, 2000, now U.S. Pat. No. 6,185,236, by the same assignee as the subject invention, and now allowed.

BACKGROUND AND PRIOR ART

The laser is a device for the generation of coherent, nearly single-wavelength and single-frequency, highly directional electromagnetic radiation emitted somewhere in the range from submillimeter through ultraviolet and x-ray wavelengths. The word laser is an acronym for the most significant feature of laser action: light amplification by stimulated emission of radiation.

There are many different kinds of laser, but they all share a crucial element: each contains material capable of amplifying radiation. This material is called the gain medium, because radiation gains energy passing through it. The physical principle responsible for this amplification is called stimulated emission. It was widely recognized that the laser would represent a scientific and technological step of the greatest magnitude, even before T. H. Maiman constructed the first one in 1960. Laser construction generally requires three components for its operation: (1) an active gain medium with energy levels that can be selectively populated; (2) a pumping process to produce population inversion between some of these energy levels; and usually (3) a resonant electromagnetic cavity structure containing the active gain medium, which serves to store the emitted radiation and provide feedback to maintain the coherence of the electromagnetic field.

In a continuously operating laser, coherent radiation will build up in the cavity to a level set by the decrease in inversion required balancing the stimulated emission process with the cavity and medium losses. The system is then said to be lasing, and radiation is emitted in a direction defined by the cavity.

A common approach to converting the laser wavelength to half its value (for example, from 1064 nm to 532 nm), often used to convert infra-red lasers to lasers emitting in the visible part of the spectrum, is to use intra-cavity frequency up conversion (IC). The most common IC approach is to incorporate a second crystal, a non-linear optical crystal, correctly oriented for phase matching, inside the laser resonator, and to adjust the reflectivity of the cavity mirrors to maximize the wavelength converted laser light emission.

The lasers of the present invention use a new crystal material as the active gain medium. The new gain medium is trivalent neodymium-doped yttrium calcium oxyborate referred to herein as $Nd^{3+}:YCa_4O(BO_3)_3$ or Nd:YCOB for easier reference. Patent Corporation Treaty (PCT) application numbered WO 96/26464 reports the growth of calcium gadolinium oxyborate, GdCOB, as the first element of a new family of borate crystals. The abstract for WO 96/26464 states, "The crystals are prepared by crystallising a congruent melting composition of general formula: $M_4LnO(BO_3)_3$. wherein M is Ca or Ca partially substituted by Sr or Ba, and Ln is a lanthanide from the group which includes Y, Gd, La and Lu. Said crystals are useful as frequency doublers and mixers, as an optical parametric oscillator or, when partially substituted by $Nd^{3+}$, as a frequency doubling laser." Although, the general formula might be interpreted to include various Nddoped crystals, the PCT application, WO 96/26464, only demonstrates and claims Nd-doped GdCOB or LaCOB. Additionally, the subject inventors have discovered that the orientation of axes and angles for the demonstrated crystals disclosed in WO 96/26464 are not efficient for a self-frequency doubling laser. More importantly, WO 96/26464 does not demonstrate nor claim any method nor apparatus for using Nd-doped YCOB as a self-frequency doubling laser.

In the prior art, there are no disclosures of Nd:YCOB as an active gain medium or as the gain medium in a harmonic generation laser. As a member of the oxyborate family of crystals, the non-hygroscopic YCOB crystal possesses nonlinear optical properties and when doped with $Nd^{3+}$ ions, the new crystals have the advantage of combining the active gain medium and the nonlinear frequency conversion medium in a single element. Self-frequency doubled (SFD) lasers are an attractive alternative to conventional intracavity frequency doubling with a separate nonlinear crystal such as potassium titanyl phosphate (KTP), as disclosed in U.S. Pat. No. 4,942,582. A SFD laser incorporates lower reflection, absorption and scattering losses and leads to a simpler and more robust resonator design. With the addition of diode-pumping, the Nd:YCOB laser provides a new type of compact, high-powered, visible laser light source.

Trivalent neodymium-doped crystalline laser systems producing optical radiation are reported. U.S. Pat. No. 4,942,582 supra, discloses a single frequency solid state laser having an active gain medium which comprises a block of neodymium doped crystals of vanadium oxide ($YVO_4$), garnet (YSGG) and borate (YAB) in combination with a separate frequency doubling crystal of KTP (potassium titanyl phosphate, or $KTiOPO_4$); this invention overlooked the self-frequency doubling possibilities of the Nd:YAB crystal. U.S. Pat. No. 5,058,118 disclosed that a single crystal of neodymium doped borate (Nd:YAB) was useful as a self-frequency doubling minilaser generating a 0.532 $\mu$m (green light) and 0.660 $\mu$m (red light) laser beam. However, this laser configuration suffers from poor optical quality and self-absorption at 530 nm as disclosed in *J. Appl. Phys.*, Vol. 66, pp. 6052–6058, 1989.

More recently, the approach to generating high power, visible laser light has been to use nonlinear optical crystals to convert near-infrared radiation to the visible portion of the spectrum via second harmonic generation (SHG) (sometimes termed frequency doubling and used interchangeably, herein). This process generates a harmonic wavelength that doubles the frequency of the fundamental wavelength. Since the SHG conversion efficiency is a function of the fundamental laser beam intensity, the nonlinear crystal is often placed inside the cavity of a low-power continuous wave laser to benefit from the higher intracavity fundamental beam intensity. This technique is discussed in U.S. Pat. No. 5,610,934 and U.S. Pat. No. 5,751,751 which provides an example of frequency doubling when neodymium doped crystals of vanadium oxide ($YVO_4$) or ($GdVO_4$) are bonded to non-linear crystals of potassium niobate ($KNbO_3$) or β barium borate (BBO). A fundamental beam of about 914 nm is frequency doubled to produce blue laser light at about 457 nanometers (nm) or (0.457 $\mu$m).

U.S. Pat. No. 5,802,086 discloses a continuous wave (cw) microlaser with a highly absorbing solid-state gain material, preferably neodymium-doped yttrium orthovanadate ($Nd:YVO_4$) that lases at two fundamental wavelengths and are frequency-mixed in a nonlinear crystal oriented within the cavity to generate a third wavelength which maybe difficult to generate directly or by frequency doubling.

Popular host crystals including garnet, especially yttrium aluminum garnet (YAG) and yttrium orthovanadate (YVO$_4$) are discussed in the prior art. However, the search for smaller, less expensive, more powerful, multifunctional lasers continues. The discovery of a new class of laser hosts, the oxyborates, makes possible the combination of linear and nonlinear optical properties in a single active medium. More particularly, the neodymium-doped oxyborate crystal (Nd:YCOB) of the present invention generates a near infrared fundamental light which can be self-frequency doubled to provide a compact, efficient, source of visible green laser light.

SUMMARY OF THE INVENTION

The first objective of this invention is to use Nd:YCOB as an active gain medium for a laser.

The second objective of this invention is to provide a self-frequency doubled (SFD) laser using the oxyborate family of-crystals as the host crystal.

The third objective of the present invention is to provide a visible light laser that combines the active gain medium and frequency doubler in one single element.

The fourth objective of this invention is to provide a compact efficient source of visible laser light.

A preferred embodiment of the invention provides a neodymium-doped oxyborate crystal (Nd:YCOB) pumped with either tunable or continuous wave (cw) coherent, diode pumped, or titanium:Sapphire laser radiation or near infrared light in a range from approximately 760 nanometer (nm) to approximately 840 nm, with highest absorption at approximately 792 nm and approximately812 nm. The preferred embodiment efficiently generates 530 nm of green laser light.

The optical pumping means which provides energy to the crystal can be selected from one of a coherent or incoherent light pumping source. The incoherent pumping source may be xenon or krypton lamps or light emitting diodes (LED) or laser diodes, which can be of pulsed or continuous wave output. The coherent pumping source may be a laser light source, such as a single laser diode or a matrix laser diode series, which can also be of pulsed or continuous wave output.

Further objects and advantages of this invention will be apparent from the following detailed description of a presently preferred embodiment, which is illustrated in the accompanying drawings.

DESCRIPTION OF THE PREFERRED EMBODIMENT

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

The Czochralski method, as reported by Qing Ye and Bruce H. T. Chai in the *Journal of Crystal Growth* 197 (1999) 228–235; "Crystal growth of YCa$_4$O(BO$_3$)$_3$ and its orientation" is used to grow the oxyborate crystal for the present invention. When rare-earth elements, such as, neodymium are added during the crystal growing process, the crystal is said to be "doped" with the rare-earth ions. Doping changes the function of the crystal into an active gain medium, since undoped YCOB crystal is a nonlinear optical medium, doping of the crystal with an impurity converts the crystal into a nonlinear optical laser crystal.

When the newly formed crystal is grown from the melt, it is generally in a cylindrical shape called a crystal "boule." The boule can be cut into a cylindrical rod or other geometric shapes. To make it into a laser crystal it generally requires two flat ends. The flat ends are polished and given an appropriate reflective coating or anti-reflective coating. One end is more reflective than the other; laser light is emitted through the end that is less reflective—the output coupler.

Undoped YCOB has been shown to have a nonlinear coefficient, $d_{eff}$ of 1.1 pm/V, which is between that of other nonlinear crystals KDP (0.37) and BBO (1.94 pm/V). See *J. Appl. Phys.* 36, 276 (1997) and W. Koechner, *Solid State Laser Engineering*, 4th ed. (Springer-Verlag New York, 1996), p. 579.

A concentration of Nd exceeding 5% or more of the doping changes the refractive indices of the crystal; which in turn, changes the optimum angle for phase matching. Nd doping for the present invention is preferably in a range from approximately 2 to approximately 20 weight % of the YCOB crystal, with optimum doping at approximately 10%.

Figure 1:
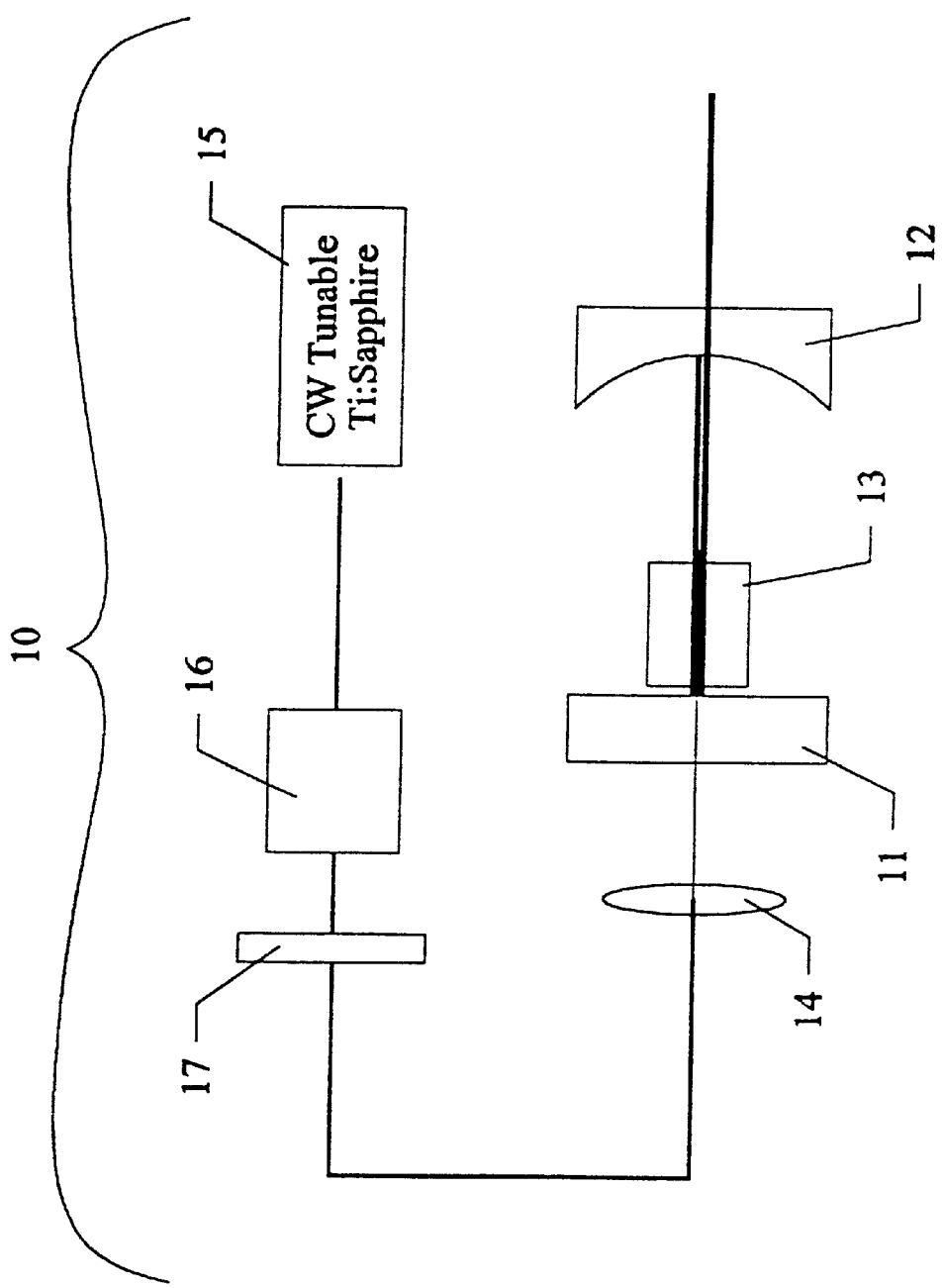
FIG. 1 is an experimental laser cavity design. F. I., Faraday isolator; HWP, half-wave plate; lens, 8.8-cm PL/CX lens; HR, 5-mROC mirror; X-tal, 2% Nd:YCOB; OC, 10-cm ROC output coupler.

Initial experiments were performed to investigate the potential of Nd:YCOB as a laser medium. A simple hemispherical laser system pumped by a tunable cw Ti:sapphire laser centered either at 792 nm or 812 nm was constructed as shown in FIG. 1. The linear cavity layout 10, consisting of a 5-meter radius of curvature (ROC) high reflective rear mirror, 11 and a 10-cm radius of curvature output coupler, 12. An uncoated 5 mm×5 mm×13 mm long 2n% Nd:YCOB crystal, 13, with the Z axis along the laser axis, was placed next to the high reflector, 11. The pump laser polarization was rotated for maximum absorption (along the Z-axis) in the crystal and focused into the crystal with an 8.8-cm plano/convex lens, 14. through the rear mirror which was approximately 82% transparent at 792 nm and 812 nm. The tunable Ti:sapphire pumping source 15, passed through the Faraday isolator 16, and traveled through the half-wave plate, 17. The half-wave plate can be used to rotate the polarization of the pump radiation.

The required optical components for the solid state laser device of this invention are the active gain medium and a pumping source. Equipment items 16 and 17 are optional. The high reflector, 11 is preferably flat and does not need the 5 meter radius of curvature (ROC). Focusing of the laser diode can be with any optical element, such as a lens.

The experimental cavity was used to generate fundamental and self-frequency doubled laser wavelengths for both 2% Nd:YCOB and 5% Nd:YCOB. It is theoretically possible for Nd-doping to be in a range up to 50 weight %; however, it is most preferred that doping be in a range from 2 to 10 weight % of the YCOB crystal. The inventors have discovered that Nd-doping concentration of approximately 10 weight % is most efficient; above 10% quenching and degradation of the crystal starts. Preferably, the YCOB crystal can be anti-reflective coated. The output power at both the fundamental and self-frequency doubled laser wavelengths were measured for 0, 1% and 2% output coupling.

Figure 2:
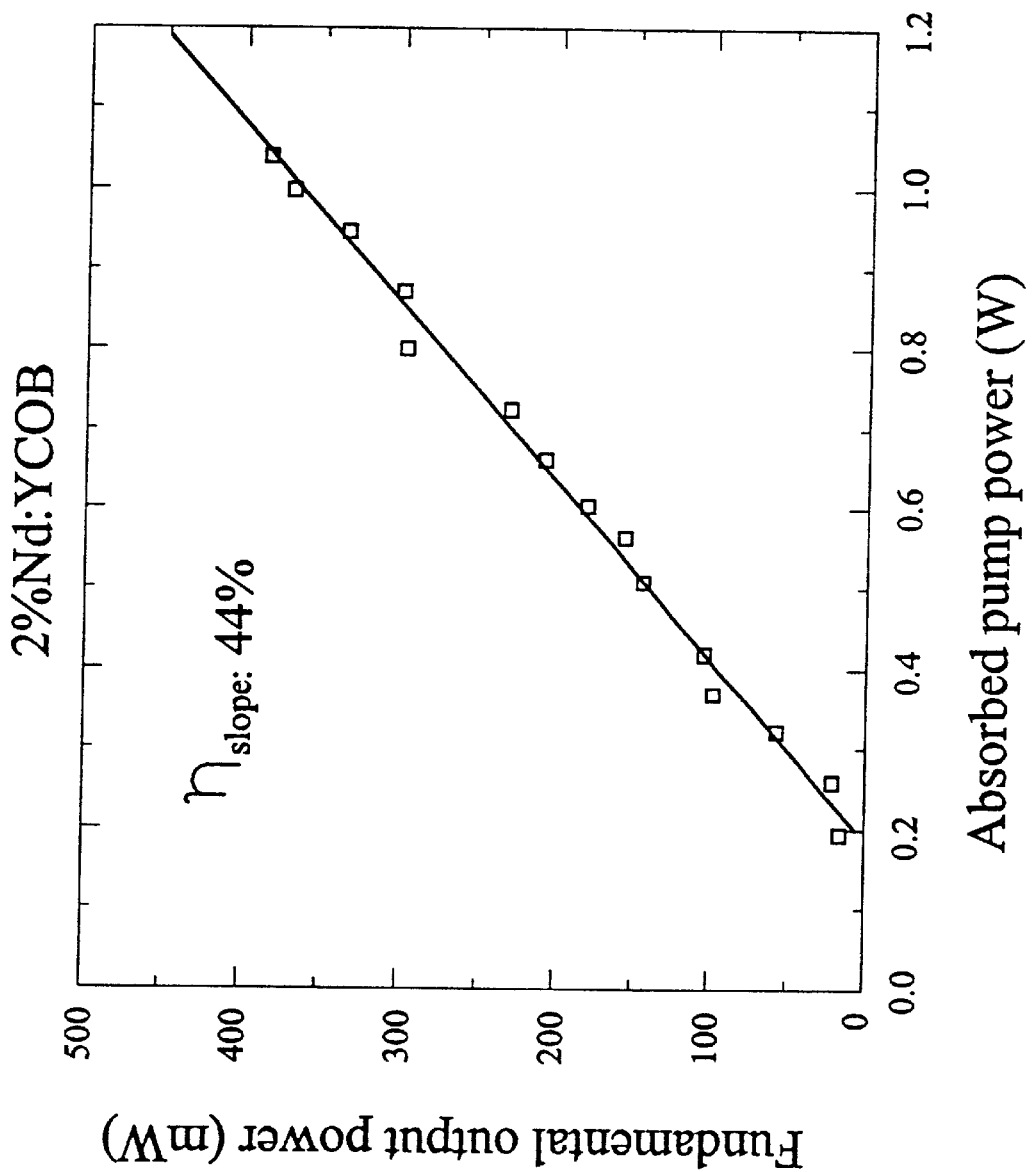
FIG. 2 is Fundamental output power at wavelength vs. absorbed Ti:Sapphire pump power for 2% Nd:YCOB.

FIG. 2 shows the fundamental output power for 2% output coupling versus absorbed pump power in a 2% Nd:YCOB laser. The minimum pump threshold for lasing at 530 nm was determined to be 97 mW for the lowest transmission output coupler. Slope efficiencies of 44% with fundamental output powers exceeding 400 mW for 1 W of absorbed pump power was observed for 2% output coupling. Green self-frequency doubled output powers of over 0.7 mW were measured for 1 W of absorbed pump power in this experimental laser system.

In another embodiment, efficient self-frequency doubling was demonstrated utilizing a 3 mm×3 mm×5 mm rotated Z-plate of 5% Nd:YCOB. Utilizing the cavity design identical to the linear cavity in FIG. 1, various pumping means were employed. The measurements shown in FIG. 3 confirm the potential efficiency of a 5% Nd:YCOB laser system when pumped by Ti:Sapphire radiation 3a) and diode laser 3b).

Figure 3A:
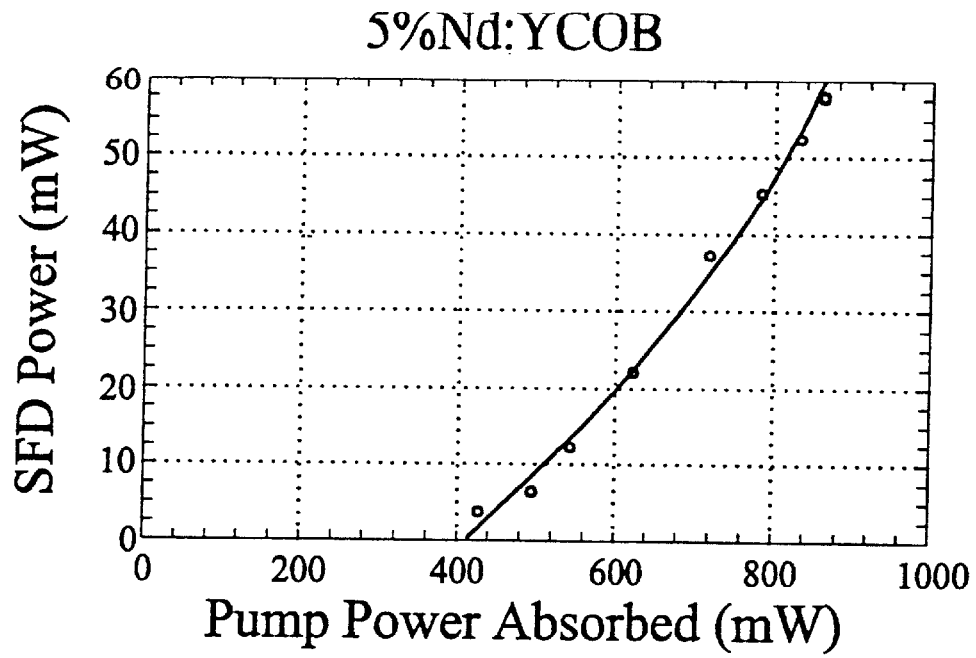
FIG. 3 is Self frequency-doubled (SFD) output power vs. absorbed pump power with 5% Nd:YCOB active gain medium. —3a) Ti:Sapphire pumped; 3b) Diode pumped.
Figure 3B:
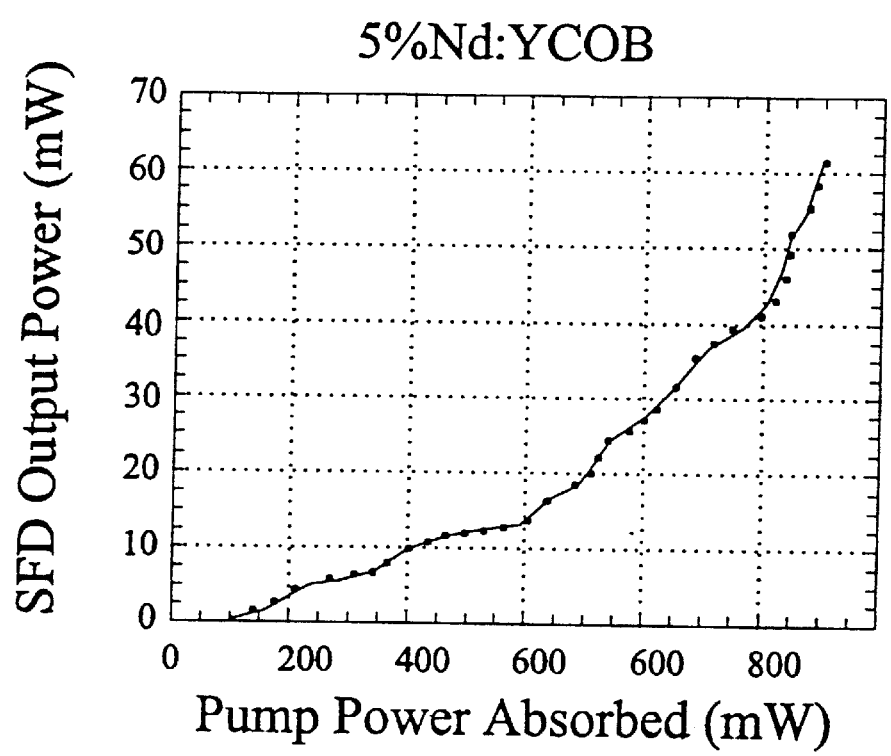

To maximize the SFD output, the output coupler was highly reflecting at 1060 nm (R>99.9%) and highly transmitting (T>94%) at 530 nm. The SFD output was optimized by adjusting the angle and hence phase matching of the crystal, by varying the mode size in the crystal, and changing the cavity length. The SFD power as a function of absorbed Ti:Sapphire pump power for a laser having an active medium of 5% Nd:YCOB is shown in FIG. 3a. Nearly 60 mW of 530 nm laser light was obtained with 900 mW of pump power absorbed in the crystal. The laser threshold for SFD output was only 23 mW of power absorbed in the crystal. No additional elements were inserted into the cavity to narrow the linewidth of the laser.

Utilizing the same configuration as above, but with single diode-pumping, 62 mW of 530 nm SFD light was generated for pump power up to 860 mW absorbed power. See FIG. 3b.

Properties, orientation and structure of the host crystal were examined. YCOB has a monoclinic crystal structure belonging to the space group Cm (point group m).

Figure 4:
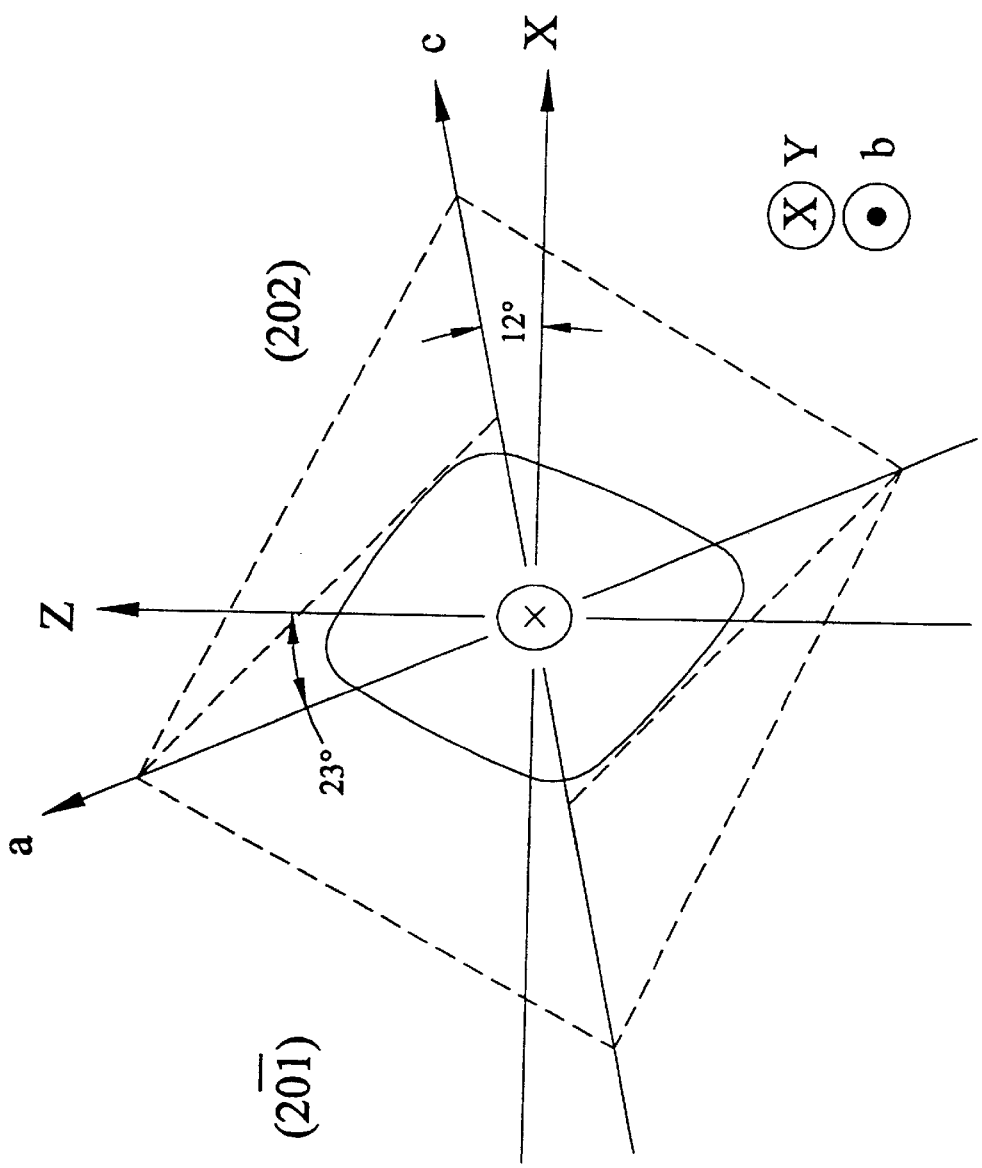
FIG. 4 shows Orientation of X, Y, Z optical indicatrix axes relative to the crystallographic axes and planes of Nd:YCOB. The typical boule cross-section is also indicated.
Figure 5:
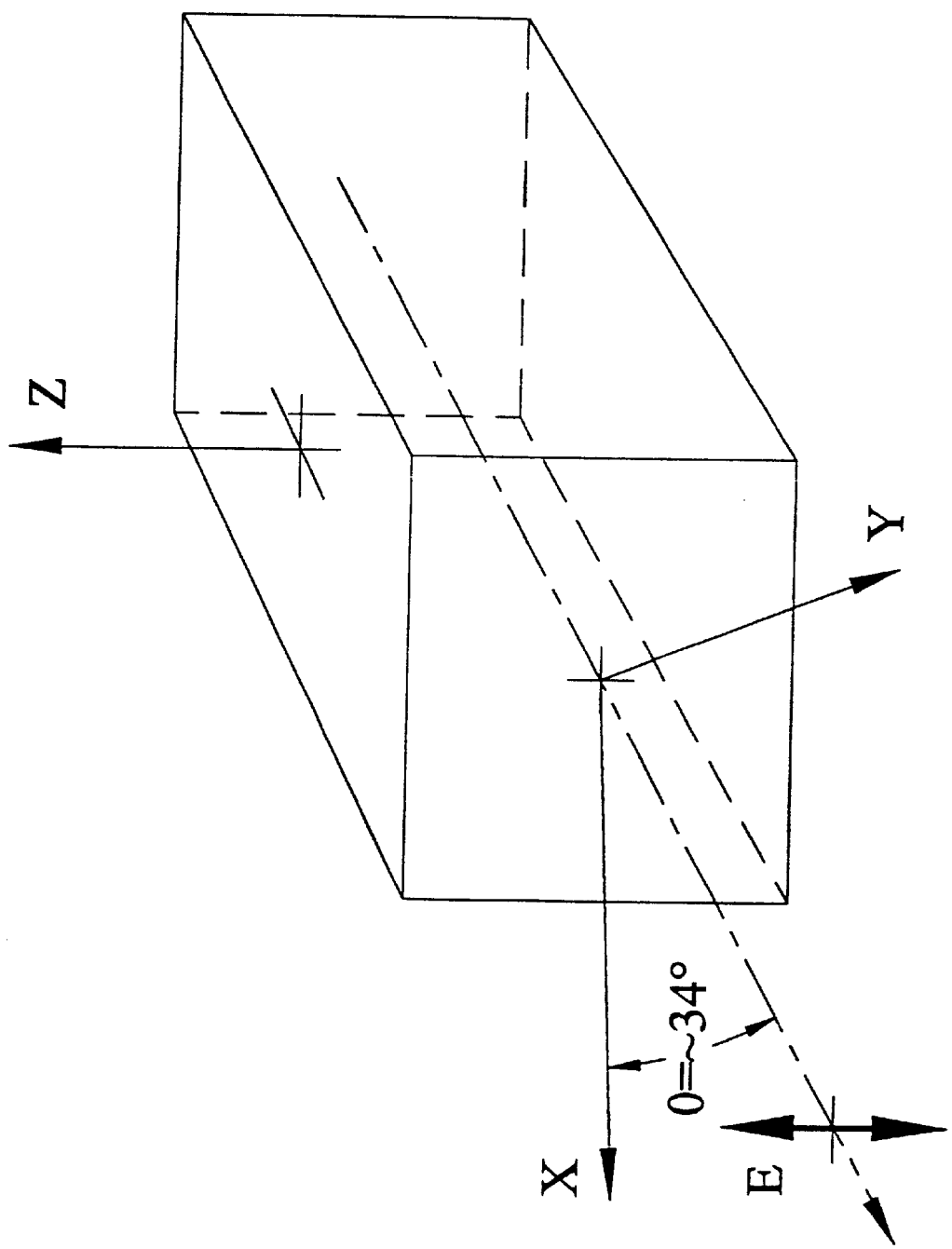
FIG. 5 is crystal orientation for optimum self-frequency doubling (SFD) laser action.
Figure 6:
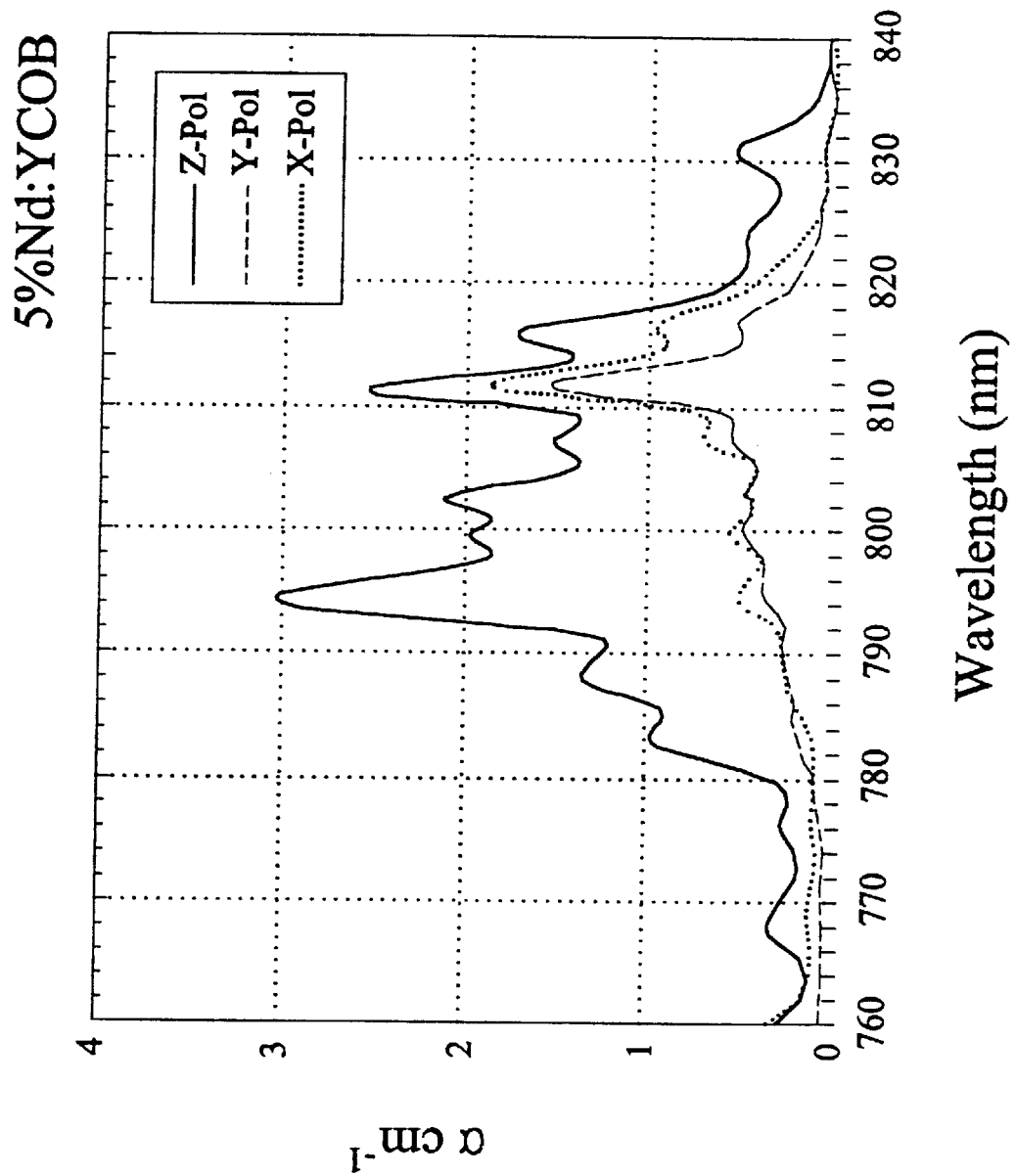
FIG. 6 is the absorption spectrum for 5% Nd:YCOB for light polarized parallel to the X, Y, Z axes shown in FIG. 5 supra.
Figure 7:
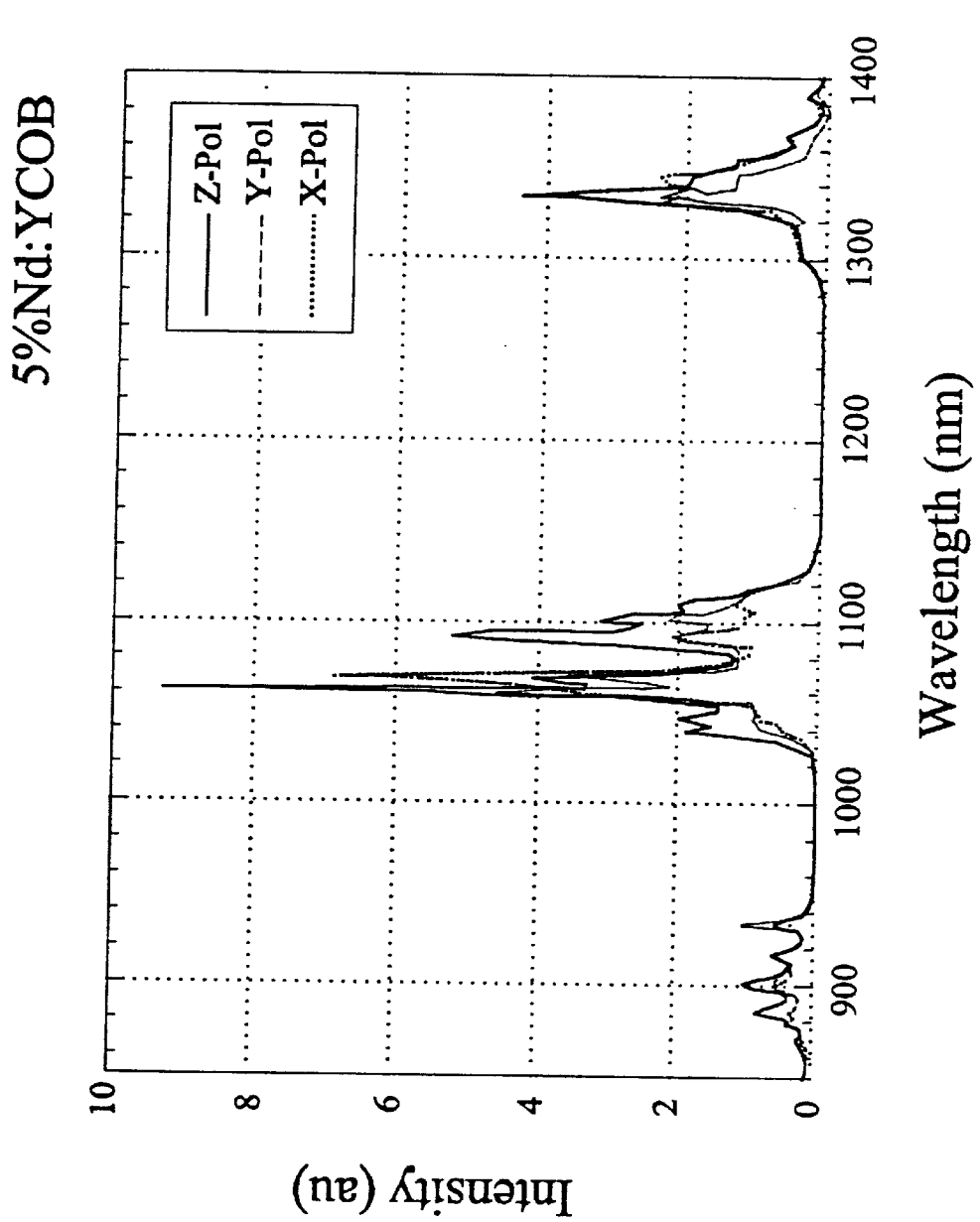
FIG. 7 is Emission spectrum for 5% Nd:YCOB as a function of polarization relative to X, Y and Z axes.

The optical indicatrix axes (X, Y and Z) are defined relative to the crystallographic axes (a, b and c) and planes as shown in FIG. 4, by adopting the traditional refractive index convention $n_x < n_y < n_z$. The b and Y axes are colinear but opposite in direction, which is denoted by the cross and dot signs. The crystal was cut with polished faces aligned at an angle of approximately 34° to the X-axis as shown in FIG. 5. The crystal surfaces were coated with an anti-reflective coating that had less than 1% reflection at 1060, 530 and 812 nm. The crystal absorbed approximately 80% of the pump light. Measurements of the polarized absorption and emission spectra of 5% Nd:YCOB for light polarized parallel to the X, Y, and Z axes were taken. The results are shown in FIGS. 6 and 7; confirming that the strongest absorption and emission of light occurs for light polarized parallel to the Z-axis. Referring to FIG. 6, the several strong absorption peaks in the vicinity of 800 nm make this material attractive for laser diode pumping. It is again noted that with the addition of diode pumping, the Nd:YCOB laser provides a-type of compact, high-power visible green laser light source.

From the foregoing experiments it was observed that diode pumped self-frequency doubling in a Nd:YCOB laser system can be demonstrated with a dichroic mirror coated directly on the face of one of the polished crystal surfaces. SFD laser emission has been observed with modest pump powers from a low brightness laser diode. It is shown that the new material, Nd:YCOB, is a promising laser crystal for development of the next generation of compact, diode-pumped, solid-state, visible laser systems.

While the invention has been described, disclosed, illustrated and shown in various terms of certain embodiments or modifications which it is presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A crystal orientation for self-frequency doubling laser action, comprising:

a crystal having crystallographic axes(a, b, c) with an optical indicatrix axes (x, y, z) relative to the crystallographic axes, where b and x are colinear and opposite in direction to one another, the crystal being cut at an angle of approximately 34 degrees to the x axis, and the crystal absorbing up to approximately 80% of a pumped laser light source, wherein the crystal produces a self-frequency doubled beam of green laser light.

2. The crystal orientation of claim 1, wherein the crystal further includes the a axis being approximately 23 degrees from the Z axes and the c axis being approximately 12 degrees from the X axis.

3. The crystal orientation of claim 1, wherein the pumped laser light source is chosen from at least one of: a xenon lamp, a krypton lamp, an array of laser diodes, and a semi-conductor diode laser.

4. The crystal orientation of claim 1, wherein the pumped light source is tuned to a wavelength range of approximately 760 nm to 840 nm.

5. The crystal orientation of claim 1, wherein the crystal further includes an anti-reflective coating at a range chosen from at least one of: approximately 520 to approximately 530 nm, approximately 760 to approximately 840 nm, and approximately 1040 to approximately 1060 nm.

6. The crystal orientation of claim 1, wherein the crystal includes: Nd:YCOB crystal.

7. A method of orienting a crystal for self-frequency doubling laser action, comprising the steps of:

forming a crystal having crystallographic axes(a, b, c) with an optical indicatrix axes (x, y, z) relative to the crystallographic axes, where b and x are colinear and opposite in direction to one another, cutting the crystal at an angle of approximately 34 degrees to a x axis; and generating a fundamental beam that is self-frequency doubled to produce green laser light.

8. The method of claim 7, wherein the crystal further includes the a axis being approximately 23 degrees from the Z axes and the c axis being approximately 12 degrees from the X axis.

9. The method of claim 7, further comprising the step of:

tuning the pumped light source to a wavelength range to approximately 760 to approximately 840 nm.

10. The method of claim 7, further comprising the step of:

coating the crystal with an anti-reflective coating at a range chosen from at least one of: approximately 520 to approximately 530 nm, approximately 760 to approximately 840 nm, and approximately 1040 to approximately 1060 nm.

11. The method of claim 7, wherein the crystal includes: Nd:YCOB crystal.

* * * * *